Nov. 8, 1966   C. B. KEPHART, JR   3,283,615
METHOD AND MEANS FOR SHARPENING A CHAIN SAW DEVICE
Filed Jan. 29, 1965
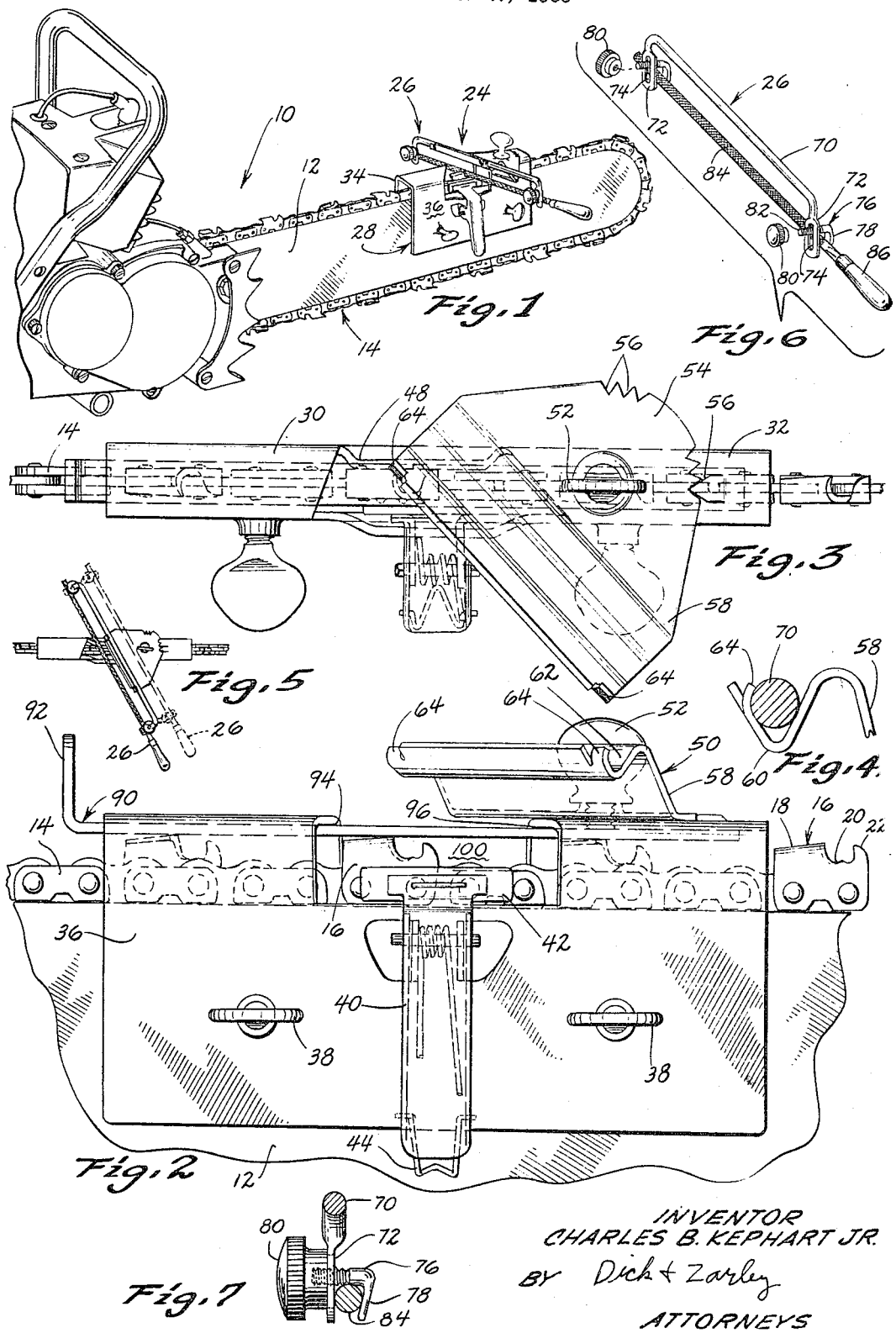
INVENTOR
CHARLES B. KEPHART JR.
BY Dick & Zarley
ATTORNEYS United States Patent Office 3,283,615
Patented Nov. 8, 1966

3,283,615
METHOD AND MEANS FOR SHARPENING A
CHAIN SAW DEVICE
Charles B. Kephart, Jr., 1620 18th St.,
West Des Moines, Iowa
Filed Jan. 29, 1965, Ser. No. 428,965
14 Claims. (Cl. 76—36)

This invention relates to a chain saw and in particular to a sharpening device and the method for using the same in the sharpening of the chain link teeth of the chain saw.

This application is a continuation-in-part of my co-pending application, Serial No. 333,375, filed December 26, 1963, now Patent No. 3,172,306, issued March 9, 1965, and Serial No. 355,808, filed March 30, 1964, now Patent No. 3,172,307, issued March 9, 1965.

It is one of the principal objects of this invention to provide a method for sharpening the chain teeth on a chain link saw wherein the file support device is positively placed in the desired position over the chain and the saw bar.

It is another related object of this invention to provide a saw sharpening device which releasably holds a file device while being used, but yet may be easily removed when desired.

A still further related object of this invention is to provide a saw sharpening device including a file having a frame which is adapted to be quickly secured to and removed from a file element.

A further object of this invention is to provide a method and means for sharpening a chain saw device which is simple in design, economical to manufacture and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings, in which:

FIG. 1 is a perspective view of a chain saw having the chain saw sharpening device of this invention mounted thereon in a position of use;

FIG. 2 is a side elevation fragmentary view of the chain saw sharpening device positioned on the chain and bar of the chain saw wherein the gauge member is used to determine the proper position for the sharpening device;

FIG. 3 is a top plan view of the chain saw sharpening device as illustrated in FIG. 2;

FIG. 4 is a cross-sectional end view of the file frame supporting member with the file frame releasably positioned therein;

FIG. 5 is a reduced in scale top plan view of the chain saw sharpening device including the file shown in solid lines in its position of use and in dash lines in its inoperative position;

FIG. 6 is a perspective view of the file device alone; and

FIG. 7 is an end view of the file device of FIG. 6.

In FIG. 1 a chain saw is shown generally referred to by the reference numeral 10 and includes a cutter bar 12 and an endless saw chain 14 extending therearound. The saw chain 14 includes a plurality of spaced apart cutter teeth 16 which each have a top plate 18, a gullet 20 and a depth gauge portion 22.

The chain saw sharpening device is generally referred to by the reference numeral 24 which includes a file unit 26 and a file support assembly 28.

The file support assembly 28 is formed from a single sheet of U-shaped metal which includes a pair of top portions 30 and 32 and two downwardly extending side walls 34 and 36. A pair of thumb screws 38 are provided in the side wall 36 for clampingly engaging the chain saw bar 12 against the opposite side wall 34. A spring loaded finger member 40 having a nose portion 42 for engaging the saw teeth 16 is provided on the side wall 36 and is provided with a clip 44 for releasably engaging the lower edge of the side wall 36 to hold the finger 40 in an open position. Opposite the nose portion 42, a portion 48 of the side wall 34 is deformed inwardly to provide a bearing surface for the saw chain 14.

A file supporting member 50 is rotatably secured by a thumb screw element 52 to the top portion 32. The thumb screw 52 extends through the base portion 54 of the file support member 50 and is adapted to maintain teeth 56 on the peripheral edge of the portion 54 in engagement with a pointer element 56 secured to the top portion 32 of the file support assembly 28. A portion 58 extends upwardly from the base portion 54 and terminates in a portion 60 having an elongated V-shaped groove 62 formed therein. At opposite ends of the portion 60, finger elements 64 are deformed out of the free edge of the portion 60 and extend partially over the V-shaped groove 62.

The file device 26 has an elongated frame member 70 which is circular in cross-section (FIG. 4) and which terminates at each of its ends in end portions 72 which are flattened and have openings 74 formed therethrough. A J-shaped threaded fastener 76 is provided which has a hook shaped portion 78 extending at an acute angle to the longitudinal axis of the fastener 76. At the opposite end of the fastener 76, a female internally threaded element 80 is secured to the threaded portion 82.

An elongated circular in cross-section file 84 having a handle 86 is clamped between the hook portion 78 and the elongated flat end portions 72 by the adjustable female threaded element 80. It is seen in FIG. 7 particularly that the file element 84 is held against the body of the J-shaped fastener 76 by the hook portion 78 and that the end portion 72 as well as the hook portion 78 extend beyond the longitudinal center of the file element 84 thereby providing sufficient clamping surfaces to hold the file element 84 locked in its desired position. It is noted also that the inner end of the female element 80 has a relatively large diameter to provide a large bearing surface for engagement with the outer face of the end portion 72.

The file unit 26 is seen supported by the saw sharpening frame assembly 28 by the V-shaped groove 62 which receives the circular in cross-section frame element 70. The finger portions 64 as shown in FIG. 4 extend just far enough over the frame member 70 to hold it in the groove against accidental displacement. The normal forces against the groove portion by the frame 70 are against the faces of the fingers 64 and therefore the fingers 64 are sufficient to hold the file unit 26 during normal operation.

In use, the file support assembly 28 is placed over the chain 14 on the bar 12 and an elongated flat member 90 having a predetermined thickness is placed on top of the chain 14, particularly the cutting links 16 where it rests on the top plate portion 18 thereof. A finger engaging portion 92 is provided on the outer end of the gauge member 90 and permits it to be readily inserted and removed from the file supporting assembly 28. Thus, the top portions 30 and 32 of the file supporting frame assembly 28 have flat straight bearing surfaces 94 and 96 for matingly engaging the top surface of the gauge member 26 and thereby limiting the downward movement of the file support assembly 28 and more importantly assuring that it is placed at a uniform level along the chain 14 and the bar 12.

Thence, the file unit 26 is placed in its position of use as shown in FIGS. 1 and 5 whereby the cutting teeth 16 may be readily sharpened by movement of the file frame 70 in the V-shaped groove 62. The file element 84 may be rotated about an axis through the file frame 70 to a position wherein it extends across an opening 100 between the top portions 30 and 32 of the file supporting frame assembly 28.

It is thus seen that a most simplified sharpening device for chain saws has been provided and also a fool-proof method for using the same to give precise sharpening of the saw teeth 16. The file support frame assembly 28 may be placed on the bar 12 in a matter of seconds by using the gauge member 90. The gauge member 90 may have any desired thickness to thereby place the file support frame assembly 28 at the proper height relative to the teeth 16 to be sharpened. The file unit 26 may be quickly assembled and disassembled to accommodate the file 84 that will be used and also the file 84 may be readily rotated to give uniform wear to all surfaces by simply loosening the female thumb elements 80.

Some changes may be made in the construction and arrangement of my method and means for sharpening a chain saw device without departing from the real spirit and purpose of my invention, and it is my intention to cover by my claims, any modified forms of structure or use of mechanical equivalents which may be reasonably included within their scope.

I claim:

1. Method of sharpening chain saw teeth characterized by placing an elongated flat member of predetermined thickness on the chain of a chain saw, placing an inverted U-shaped chain saw sharpening device having a top portion and two downwardly extending side walls with a flat straight bearing surface formed on the underside of the top portion and including a file member, over the elongated flat member so that the bearing surface engages the elongated flat member, securing the sharpening device to the bar of the chain saw, removing the elongated flat member from between the chain and the bearing surface of the sharpening device and filing the teeth with the file member.

2. A file holder for use in sharpening the beveled arcuate cutting edges of chain saw teeth disposed along a longitudinal edge of a chain saw, said holder comprising, an inverted U-shaped channel member adapted to straddle said chain saw and including parallel spaced apart side walls interconnected by a channel base, with the side walls of said channel member being disposed on opposite sides of said chain saw, and the channel base being disposed adjacent the longitudinal edge thereof; said channel base and said side walls having an elongated opening formed intermediate the ends of said channel members and thereby defining a base portion at each end of said channel member, whereby a tooth on said chain saw will be exposed through said opening, means on said channel member to engage said saw tooth to hold it firmly for sharpening, a file supporting member pivotally mounted on one of said base portions at a point adjacent said opening and having a V-shaped elongated groove portion, and extending partially over said said opening in said channel member, a file frame being slidably received in said V-shaped groove portion and carrying a file in parallel spaced relation to said file frame and adapted to be moved in a longitudinal direction through the opening in said channel member, said file frame detachably resting in said V-shaped groove portion whereby said file can be simultaneously rotated and lifted into or out of engagement with the beveled arcuate cutting edge of a saw tooth firmly held within said opening, said file supporting member having at least one finger extending partially over the V-shaped groove to releasably retain the file frame therein.

3. The structure of claim 2 wherein said file frame is circular in cross-section.

4. The structure of claim 2 wherein said file frame is circular in cross-section, said file frame has a diameter such that said frame is supported by the walls of said V-shaped groove about the base thereof.

5. The structure of claim 2 wherein a finger is provided at opposite ends of said V-shaped elongated groove portion and said file frame is circular in cross section.

6. The structure of claim 2 wherein a finger is provided at opposite ends of said V-shaped elongated groove portion and said file are each circular in cross-section.

7. The structure of claim 2 wherein said file supporting member includes a portion extending upwardly from the portion pivoted to said one base portion and said upwardly extending portion being integrally connected to said V-shaped groove portion and serving to position it above said opening in said channel member.

8. The structure of claim 2 wherein said file frame is provided with parallel end elements extending at right angles to the longitudinal axis of said frame, said elements having openings formed therein, a threaded element extending through each of said openings, said element having a hook means extending at an angle thereto on one end for releasable engagement with said file and a detachable threaded female element mounted on the opposite end thereof, said file being clamped between said end elements and said hook portions, and said female elements being adapted to be selectively adjusted to vary the clamping pressure on said file.

9. The structure of claim 2 wherein said file is circular in cross-section and said file frame is provided with parallel end elements extending at right angles to the longitudinal axis of said frame, said elements having openings formed therein, a threaded element extending through each of said openings, said element having a hook means extending at an angle thereto on one end for releasable engagement with said file and a detachable threaded female element mounted on the opposite end thereof, said file being clamped between said end elements and said hook portions, said end elements and said hook means having sufficient size that they each extend at least to the longitudinal axis of said file when said file is positioned against said threaded element, and said female elements being adapted to be selectively adjusted to vary the clamping pressure on said file.

10. In a file device for use in sharpening chain saws, comprising, an elongated frame having end elements extending at substantially right angles thereto, said elements having an opening formed therethrough, a threaded element extending through each of said openings, said threaded element having a hook portion extending at an angle thereto on one end thereof, a threaded female element mounted on the opposite end of said threaded element, an elongated file element having its ends disposed between said hook portions and said end elements, and being positioned against said threaded element, said female elements being adapted to be selectively adjusted to clamp said file between said hook portions and said end elements.

11. The structure of claim 10 wherein said file is circular in cross-section at least in the area where it is being clamped and said end elements and hook portions have sufficient size that they each extend at least to the longitudinal axis of said file.

12. The structure of claim 10 wherein said hook portion extends at an acute angle to said threaded element.

13. In combination, a chain saw having a bar with a cutting chain extending around its peripheral edge, an elongated flat member having a predetermined thickness on the chain of the chain saw, an inverted U-shaped member having a top portion and two downwardly extending side walls with a flat straight bearing surface formed on the underside of the top portion and including a file member, over the elongated flat member, said bearing surface engaging said flat member along its substantial length and means securing said U-shaped member to the bar of said chain saw.

14. In combination, a chain saw having a bar with a cutting chain extending around its peripheral edge, an elongated flat member having a predetermined thickness on the chain of the chain saw, an inverted U-shaped member having a top portion and two downwardly extending side walls with a flat straight bearing surface formed on the underside of the top portion and including a file member, over the elongated flat member, said bearing surface engaging said flat member along its substantial length and means securing said U-shaped member to the bar of said chain saw, said top portion of said U-shaped member having an opening formed therein through which a tooth in said cutting chain is exposed, and support means for positioning said file member at a predetermined elevation above said exposed tooth.

No references cited.

GRANVILLE Y. CUSTER, Jr., *Primary Examiner.*